United States Patent [19]
Drexler

[11] Patent Number: 4,758,485
[45] Date of Patent: Jul. 19, 1988

[54] SLIDES AND RECORDING METHOD FOR AUDIOVISUAL SLIDE SHOW

[75] Inventor: Jerome Drexler, Los Altos Hills, Calif.

[73] Assignee: Drexler Technology Corporation, Mountain View, Calif.

[21] Appl. No.: 917,271

[22] Filed: Oct. 8, 1986

Related U.S. Application Data

[63] Continuation of Ser. No. 693,857, Jan. 22, 1985, abandoned, which is a continuation-in-part of Ser. No. 443,596, Nov. 22, 1982, Pat. No. 4,503,135, which is a continuation-in-part of Ser. No. 238,832, Feb. 27, 1981, Pat. No. 4,360,728, which is a continuation-in-part of Ser. No. 238,833, Feb. 27, 1981, abandoned.

[51] Int. Cl.$^4$ ............................ G03C 3/00; G03C 5/14
[52] U.S. Cl. ..................................... 430/12; 430/140; 430/320; 430/945; 353/19; 353/120; 346/76 L
[58] Field of Search .................. 430/12, 15, 140, 945, 430/320; 346/76 L; 353/120, 15, 19

[56] References Cited

U.S. PATENT DOCUMENTS

| | | | |
|---|---|---|---|
| 3,379,045 | 4/1968 | Kaprelian | 353/19 |
| 3,932,032 | 1/1976 | Weinstein | 352/11 |
| 4,014,604 | 3/1977 | Schwartz | 353/120 |
| 4,102,569 | 7/1978 | Schwartz | 353/120 |
| 4,230,939 | 10/1980 | de Bont et al. | 235/488 |
| 4,278,756 | 7/1981 | Bouldin et al. | 430/414 |
| 4,284,716 | 8/1981 | Drexler et al. | 430/510 |
| 4,312,938 | 1/1982 | Drexler et al. | 430/496 |
| 4,343,879 | 8/1982 | Drexler et al. | 430/414 |
| 4,360,728 | 11/1982 | Drexler | 235/462 |
| 4,366,217 | 12/1982 | Bird et al. | 430/11 |
| 4,461,552 | 7/1984 | Levine | 352/27 |
| 4,503,135 | 3/1985 | Drexler | 430/12 |

FOREIGN PATENT DOCUMENTS 203636 12/1978 United Kingdom .
204417 10/1980 United Kingdom .

OTHER PUBLICATIONS

Business Week, "Talking Chips: Now More Choices," p. 68A,B, Jul. 28, 1980.

Primary Examiner—John E. Kittle
Assistant Examiner—José G. Dees
Attorney, Agent, or Firm—Thomas Schneck

[57] ABSTRACT

An audiovisual slide show is recorded by collecting a set of slides having pictures dealing with a broad topic. A strip of laser recording material is disposed on each slide. A laser writes a data pattern corresponding to spoken words on the strip. The words give a self-contained characterization of the picture on a slide. A subset of slides is selected from the set of slides so as to form a slide show. The slides have a photographic image mounted in a holder. A strip of laser recording optical data material is disposed on the border of the holder or on the film adjacent to the image. The strips can store about fifty seconds of human speech or ten times as much artificial speech, such as phoneme speech.

14 Claims, 3 Drawing Sheets

SLIDES AND RECORDING METHOD FOR AUDIOVISUAL SLIDE SHOW

CROSS REFERENCE TO RELATED APPLICATION

This is a continuation of co-pending application Ser. No. 693,857 filed on Jan. 22, 1985, abandoned, which is a continuation-in-part of patent application Ser. No. 443,596 filed Nov. 22, 1982 now U.S. Pat. No. 4,503,135, which is a continuation-in-part of patent application Ser. No. 238,832 filed Feb. 27, 1981, now U.S. Pat. No. 4,360,728, granted Nov. 23, 1982, which is a continuation-in-part of patent application Ser. No. 238,833 filed Feb. 27, 1981, abandoned.

TECHNICAL FIELD

The invention relates to photographic slide transparencies and in particular to the recording of spoken words on the slides.

BACKGROUND ART

Schwartz (U.S. Pat. Nos. 4,014,604 and 4,102,569) teaches a sound slide having a transparency, a frame with a window for accommodating the transparency, and a sound track carrier on part of the frame. The sound track carrier is coated on opposite sides with layers of magnetic material. One or more pairs of magnetic recording and playback heads are supported by a carrier which is rotatable, linearly displaceable, or both simultaneously so as to scan the magnetic material.

A problem with using magnetic material for recording is its low information storage capacity. A standard two by two inch frame must be enlarged to hold thirty to sixty seconds of speech. To hold more than two minutes of speech is impossible without more than doubling the size of the frame over the standard size.

A further problem is that magnetic recording media is subject to wear. Not only is wear caused by contact with the recording and playback heads, but the media can also be damaged when a number of slides are stacked together or during handling.

In the past, the motion picture industry has employed sound track recording on a 0.1 inch wide strip of the 35 mm film carrying visual images. Sound is usually recorded on film by means of varying the exposure to light corresponding to sound vibrations. Synchronization of sound with pictures allows video images to be accompanied by analog data regarding the images.

An object of the present invention is to provide a means of recording directly on a film slide, sound, control data and digitized visual images to accompany that image either prior to, during, or after exposure forming such image.

Another object of the present invention is to record sound on a medium that is high capacity, so as to be capable of recording for thirty to sixty seconds on a standard two inch by two inch frame.

Another object of the present invention is to provide a medium that does not require contact of the medium with the record, or playback mechanism and is wear resistant.

DISCLOSURE OF THE INVENTION

The above objects have been met with a method for recording an audiovisual slide show using novel photographic slides. Each slide has a photographic image mounted in a holder. The holder has a border zone surrounding the image on which is disposed a strip of direct-read-after-write (DRAW) or thermally developed laser recording material. The image may also be generated using computer graphics.

After collecting a set of slides having pictures dealing with a broad topic, and after disposing the laser recording strip on the slide, a data pattern is written on the strip with a laser. A laser beam records data on the strip either by ablation, melting, physical or chemical change, or deformation, forming spots representing changes in reflectivity detectable by a light detector. In this manner, data concerning the visual image may be recorded and read directly from the strip.

The data pattern corresponds to spoken words giving a self-contained characterization of the picture on the slide. The words may be human speech spoken into a microphone and digitized, or the words may be artificial speech, such as phoneme speech. Digital information, representing control signals or alphanumeric information to be displayed on a CRT display, may also be recorded on the strip. Music can also be recorded.

No processing after laser recording is required for the recording strip when it is a direct-read-after-write material. Laser recording materials also may be used that require heat processing after laser recording. The uniform surface reflectivity of this strip before recording typically would range between 8% and 65%. Laser recording may create either low reflectivity spots in a reflective field of high reflective spots in a low reflectivity field. The average reflectivity over a laser recorded hole might be in the range of 5% to 25% in a high reflective field and be in the range of 40% to 50% in a low reflective field. Thus, the reflective contrast ratio of the recorded holes would range between 2:1 and 7:1. Photographic pre-formatting would create spots having a 10% reflectivity in a high reflective field or 40% in a low reflectivity field. Processing of the exposed silver-halide emulsion does not affect the recordability of the reflective strip. If the substrate used is transparent, the recorded data may also be read by light transmission through recorded holes.

An advantage of the present invention is that a one inch long strip of 16 mm wide laser recording material can hold 50 seconds of human speech or eight minutes of phoneme speech. The strip is able to fit on the slide border of a standard two inch by two inch slide. Further, since reading is done using a laser, no wear is caused by contact with a playback head. The strip can be further protected against scratches by a laminated plastic coating or other means.

BEST MODE FOR CARRYING OUT THE INVENTION

Figure 1:
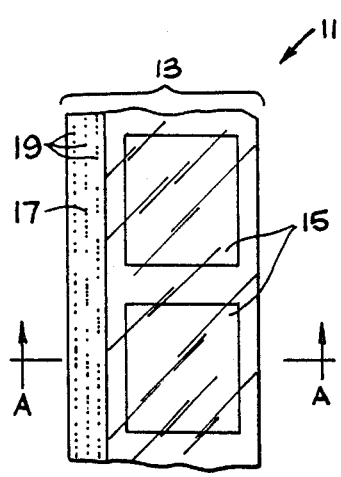
FIG. 1 is a top view of an optical data recording medium for use with the transparencies of the present invention.

With reference to FIG. 1, the recording medium of the present invention may be seen to comprise a photographic film 11 having a planar major surface 13 which is divided into a photographic image areas 15 and a data strip 17. Photgraphic film 11 is preferably in sheet form, for example slide transparency film. The photographic image areas 15 are conventional photographic images, produced by usual photographic techniques, typically by exposure and development of the film. The image may also be generated by computer graphics. The image areas 15 may occupy the entirety of the film except for the data strip, or discrete areas as shown in FIG. 1. Several images may be disposed on a unitary film member. Alternatively, only a single image may be on the film, such as in slide transparency film.

The present invention features an optical data strip 17 which may be a DRAW material which may have either prerecorded information or user-written information, or both. The type of DRAW material used may be relatively highly reflective material which forms a shiny field against pits, craters or holes in the reflective surface which tend to be absorptive of light energy. The contrast differences between the pits and the shiny reflective field surrounding the pits cause variations at a detector when the pits are illuminated by light of lesser intensity than the light that originally created the pits. Alternatively, the material may form reflective spots against an absorptive field. An example of the latter type is described in U.S. Pat. No. 4,343,879.

Data strip 17 is intended to provide spoken words accompanying the photographic images on the same material just as a movie sound track accompanies a sequence of frames of film. Data is written in individual tracks extending in a longitudinal direction, as indicated by the spot patterns 19 and these spot patterns are analogous to sound track on a film, except that the data tracks contain a much higher density of information and are usually read in reflection, rather than in transmission. The information density is greater because each of the spots in the data pattern is approximately 5 microns in diameter with a spacing of about 5–10 microns between spots. The spots may be either digital or analog data, but in either case are recorded by a laser in the usual way, for example as shown in U.S. Pat. No. 4,278,756 to Bouldin, et al.

Figure 2:
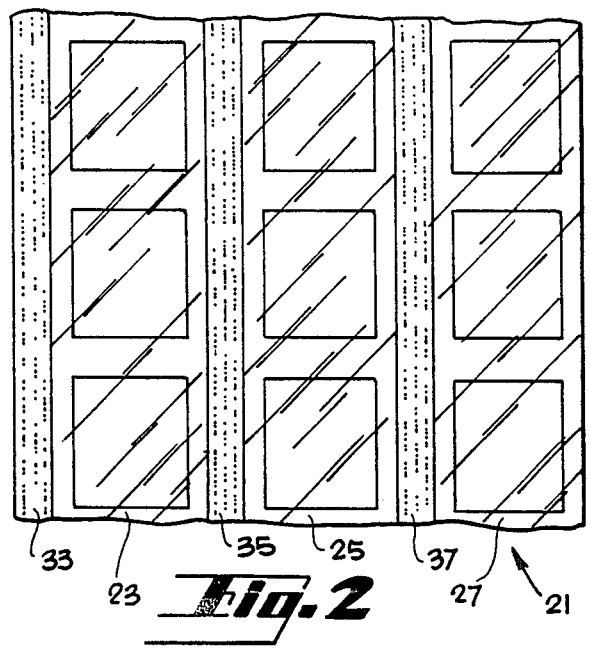
FIG. 2 is a top view of another optical data recording medium for use with the transparencies of the present invention.

FIG. 2 is similar to FIG. 1 except that a larger photographic medium 21 is used with a plurality of rows of images 23, 25 and 27. Accompanying each row of images is a corresponding data strip 33, 35 and 37. These data strips are analogous in construction to the strip of FIG. 1. Once again, it is not necessary that each row have individually different images. Each row may consist of either multiple images or a single image. The embodiment of FIG. 2 is a microfiche type medium where each row of images would have corresponding data on a data strip. The images are such that they can be viewed with the naked eye or with low power (magnification) optical systems. On the other hand, the data strips are not usually read with the naked eye, but require either microscopic inspection or preferably reading by reflection of a scanning laser beam as explained below.

Figure 3:
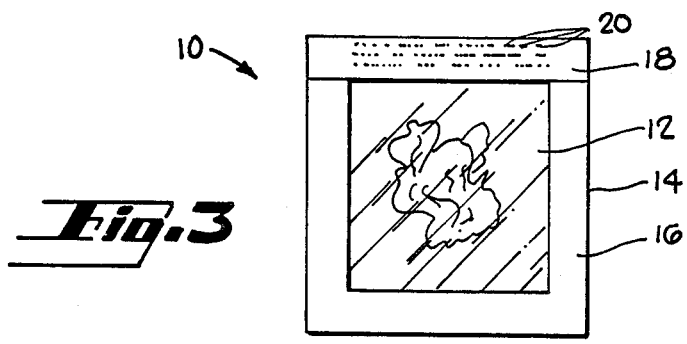
FIG. 3 is a top view of a photographic slide of the present invention.

In FIG. 3, a photgraphic slide 10 for use in an audiovisual slide show is seen. A photgraphic image 12 is mounted in a holder 14 having borders 16 surrounding the image 12. Typically, the image is on a 24×36 mm transparency mounted in a conventional 2×2 inch mount, but other size slides may be constructed. Many slide projectors also accept unmounted slides as, for example, the single image alternative of FIG. 1. The holder or mounted slides may be cardboard, or preferably plastic.

Disposed on the border 16 of holder 14 is a strip 18 of DRAW laser recording material having laser written speech thereon. A laser creates spots 20, representing changes in reflectivity on the strip. The contrast differences between the spots 20 and the surrounding field of the strip 18 are detectable by a light detector when the spots are illuminated by light of a lesser intensity than light that originally created the spots. When disposed on a conventional size border 16, the strip may be up to two inches long. The strip is typically 16 mm wide. Alternatively, the strip may be disposed adjacent to the image directly on the film, as in FIG. 1.

The speech is recorded as a data pattern of spots 20. The data may be human speech which has been spoken into a microphone, then converted into a digital signal. A 16 mm wide, one inch long strip of the material described in U.S. Pat. No. 4,284,716 to Drexler et al. can hold fifty seconds of human speech. Artificial speech may be recorded using a computer. Three different techniques for synthesizing voice are described in Business Week, "Talking Chips: Now, More Choices," p. 68A, E, July 28, 1980. Phoneme speech may be used to record ten times as much speech as human speech.

Figure 4:
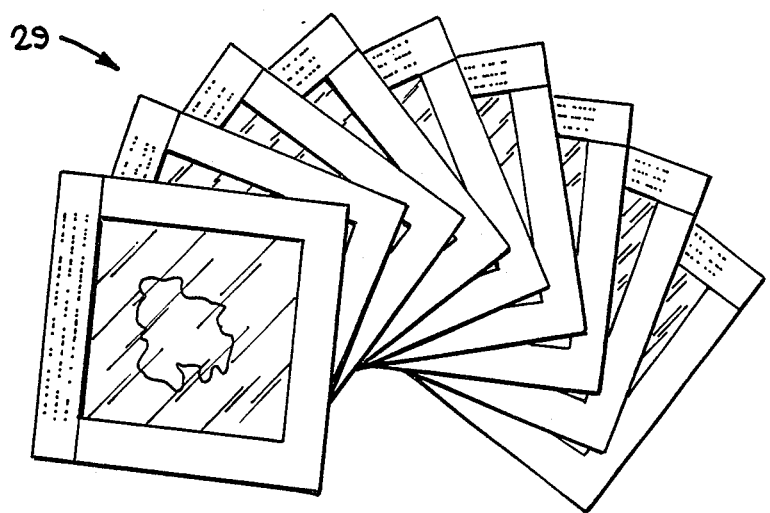
FIG. 4 is a top view of a set of slides forming a slide show of the present invention.

FIG. 4 shows a set of slides 29 forming an audiovisual slide show. The slides are those in FIG. 3, or alternatively, the single image version of FIG. 1. Each of the slides in the collection has an image dealing with a broad topic. The set 29 is collected and strips 18 of laser recording material are disposed on each of the slides. On each of the strips 18, a data pattern corresponding to spoken words is written using a laser. The words recorded typically give a self-contained characterization of the photographic image on the slide. After writing spoken words on the strip, a subset of slides taken from the set may be assembled. The subset of slides deals with a topic within the broad topic forming a slide show.

Figure 5:
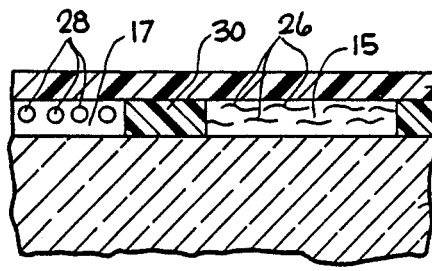
FIGS. 5-8 are alternate sectional constructions of the medium of FIG. 1 taken along lines A—A in FIG. 1.

FIG. 5 illustrates a first construction of the recording medium shown in FIG. 1. The sectional view includes a substrate 22 which is transparent and may be one of the many polymeric substrate materials known in photographic arts. Applied to the substrate 22 is a subbing layer, not shown, and an emulsion layer 24. This emulsion layer has a photograhic image area 15 made by exposure and development in the usual way. The wavy lines 26 represent filamentary black silver particles which characterize normal photographic black and clear images. Data strip 17 is one of many laser recording materials. For example, it could be made from silver-halide emulsion having fine grain size, less than 0.1 microns, by a silver diffusion transfer process described in U.S. Pat. No. 4,312,938 (Drexler and Bouldin), incorporated by references herein.

In the referenced patented process, silver-halide emulsion is exposed to a non-saturating level of actinic radiation to activate silver halide. The activated emulsion is then photographically developed to a gray color of an optical density of 0.05-2.0 to red light, forming an absorbtive underlayer. There is no fixing after this first development step. The surface of the emulsion strip is then fogged by a fogging agent such as borohydride to produce silver precipitating nuclei from the part of the unexposed and undeveloped silver-halide emulsion. The strip is then contacted with a monobath containing a silver-halide solvent and a silver reducing agent to complex, transfer and reduce the remaining unexposed and undeveloped silver to reflective non-filamentary silver at the nuclei sites on the surface. The reflective layer contains from 20% to 50% silver particles of which 1% to 50% may be filamentary silver formed in the initial development step. Beneath the reflective layer is an absorptive underlayer.

The reflective surface layer is characterized by non-filamentary particles 28 overlying a concentration of filamentary particles which form the absorptive underlayer. Separating the data strip from the image area is an unprocessed silver-halide buffer area 30 which would remain generally clear since it is neither exposed nor developed. The buffer area 30 is not necessary, but is desirable because chemical processing of data strip 17 differs from the processing of image area 15. The buffer area 30 may be fixed to remove silver halide so that the area will remain clear. This is optional. Both processes may occur by spraying of chemicals onto the surface of the film, with a mask covering buffer area 30. Such spray processing is well known in photolithography. However, in the present case it may be necessary to proceed in two steps. In the first step, conventional photographic processing of image area 26 takes place. Subsequently, the image area, together with the buffer area 30 is masked to allow seperate processing of the data strip 28. After processing is complete, a transparent layer 32 is applied to the emulsion, forming a protective layer. Layer 32 may be any of the well known protective coatings, including a layer of clear gelatin. The remainder of the film, apart from the data strip 17, need not have fine grain size. Data strip 17 can also be added to the photographic film in the form of an adhesive tape which is bonded to the photographic film either before or after the film is developed.

Figure 6:
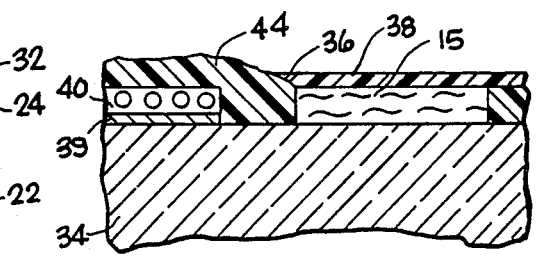

FIG. 6 is similar to FIG. 5 except that substrate 34 is coated only with silver-halide emulsion to the right of line 36. The image area 15 is exposed, developed and fixed. A protective coating 38 may then be applied. A preformed strip 40 of laser recording material may then be disposed on the substrate. This may be a strip of Drexon material. Drexon is a trademark of Drexler Technology Corporation for reflective silver based laser recording material, such as that described in the aforementioned U.S. Pat. No. 4,312,938. Such a preformed strip of laser recording material would have its own thin substrate 39 carrying the emulsion layer. Alternatively, the recording material could be any of the other direct-read-after-write laser recording materials, for example such as that described in U.S. Pat. No. 4,230,939 issued to DeBont, et al. where the patent teaches a thin metallic recording layer of reflective metal such as Bi, Te, Ind, Sn, Cu, Al, Pt, Au, Rh, As, Sb, Ge, Se, Ga. Materials which are preferred are those having high reflectivity and low melting point, particularly Cd, Sn, Tl, Ind, Bi and amalgams. These materials may be deposited directly on substrate 34, as by sputtering, or may be premanufactured on a very thin substrate and adhered to the substrate by means of a subbing layer. After adhering the laser recording material to the substrate, a transparent protective coating 44 is applied. This coating material may be the same as protective material 38.

Figure 7:
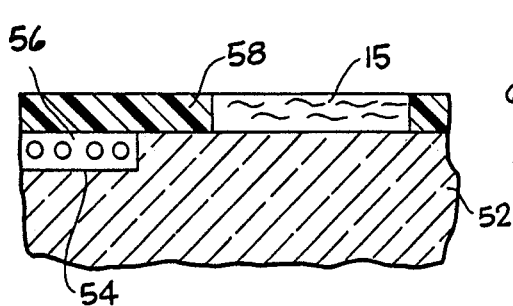

With reference to FIG. 7, substrate 52 has a notch or groove 54 which allows placement of a DRAW material 56 therein. This laser recording material may be processed in situ from silver-halide material previously existing in the groove, as in the case of FIG. 5, or preexisting laser recording material which is placed in the groove, as with the preexisting laser recording material of FIG. 6. In either case, the photographic image area 15 is exposed and developed in the usual way, while an unexposed and undeveloped area 58 protects data strip 56. Since emulsion area 58 is unexposed and undeveloped, it remains clear and forms a protective layer over the data strip.

Figure 8:
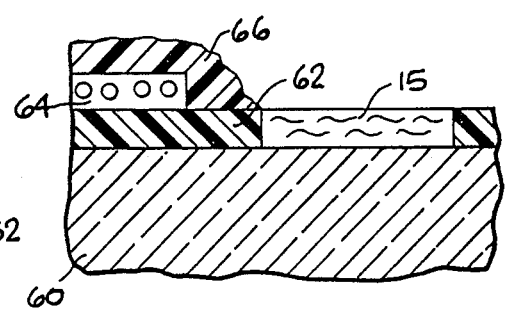

In the embodiment of FIG. 8, no groove exists in substrate 60. Rather, a photographic image area 15 is exposed and developed in the usual way, with the remainder of the substrate being covered with emulsion which is masked and protected from exposure and development, forming a protected region 62. On top of the protected region 62 a strip of laser recording material 64 is positioned. This laser recording material may be formed in situ by application of a silver-halide emulsion strip which is then processed, as data strip 17 in FIG. 5 is processed, or may be a preformed strip which is applied as in FIG. 4. The strip is then covered with a protective coating 66.

Figure 9:
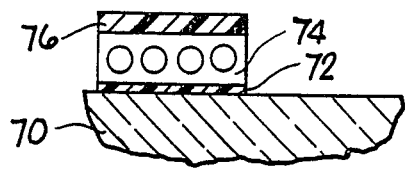
FIG. 9 is a partial sectional view of an alternate optical data recording medium.

With reference to FIG. 9, a substrate 70 is shown which carries a photographic image in a substrate portion not shown. This image may be above the substrate surface or within a groove of the substrate, as previously mentioned. The substrate carries a secondary substrate 72 which is a thin flexible material, only a few mils thick carrying a laser recording material 74. The secondary substrate 72 is adhered to the primary substrate 70 by means of an adhesive or sticky substance, similar to dry adhesives found on tape. The laser recording material may be any of the materials previously discussed, such as DREXON material, except that the secondary substrate 72 is substituted for the substrate previously mentioned. A protective coating 76 is applied over the laser recording material. Using this embodiment, photographs of the prior art may be converted to the optical data and image medium of the present invention. In this situation, not shown in the drawing of FIG. 9, a portion of an image area is converted to a nonimage area by application of the sticky laser recording material. The laser recording material rests above developed silver-halide emulsion, resembling FIG. 8, except that the emulsion is completely exposed and developed in the region underlying the secondary substrate.

In all of these embodiments, a strip of laser recording material is positioned adjacent one or more photographic images for providing data storage of a similar quality for data as for the photo image. Remarks in the form of alphanumerics, voice, or digitized pictures may be recorded adjacent to the photographic image. By this means the audio and visual forms of communication will not be seperated. This arrangement is of particular value to add spoken words giving a self-contained characterization of the photographic image on a slide.

Figure 10:
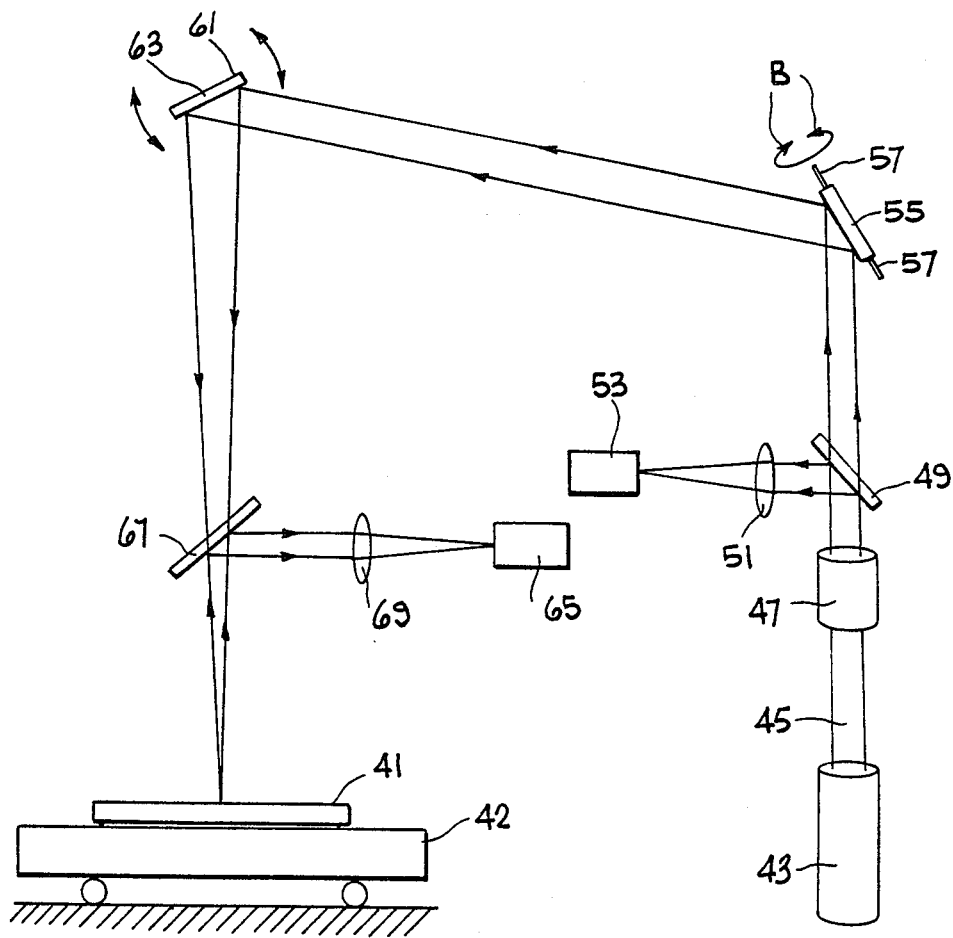
FIG. 10 is a plan view of optical apparatus for reading and writing on the data strip portion of the medium illustrated in FIG. 1.

Of course, while the photo images may be read by conventional means, low-powered laser or a photodetector array apparatus must be used to read the data strip. A laser apparatus is illustrated in FIG. 10, which illustrates the side view of the lengthwise dimension of the medium of FIG. 1 consisting of a data strip in combination with photo images. The data strip portion 41 of the medium is usually received in a movable holder 42 which brings the strip into the trajectory of a laser beam. A laser light source 43, preferably a pulsed semiconductor laser of infrared wavelength emits a beam 45 which passes through collimating and focusing optics 47. The beam is sampled by a beam splitter 49 which transmits a portion of the beam through a focusing lens 51 to a photodetector 53. The detector 53 confirms laser writing. The beam is then directed to a first servo controlled mirror 55 which is mounted for rotation along axis 57 in the direction indicated by arrows B. The purpose of the mirror 55 is to find the lateral edges of the data strip in a coarse mode of operation and then in a fine mode of operation identify data paths which exist predetermined distances from the edges.

From mirror 55, the beam is directed toward a mirror 61. This mirror is mounted for rotation at pivot 63. The purpose of mirror 55 is for fine control of motion of the beam along the length of the data strip. Coarse control of the lengthwise portion of the data strip relative to the beam is achieved by motion of the movable holder 42. The position of the holder may be established by a linear motor adjusted by a closed loop postion servo system of the type used in magnetic disk drives. Reference position information may be prerecorded on the card so that position error signals may be generated and used as feedback in motor control. Digital information representing alphanumeric information to be displayed on a CRT display may also be prerecorded or recorded late. Upon reading one data path, the mirror 55 is slightly rotated. The motor moves holder 42 lengthwise so that the path can be read again, and so on. As light is scattered and reflected from spots in the laser recording material, the reflectivity of the beam changes relative to surrounding material where no spots exist. The beam changes relative to surrounding material where no spots exist. The beam should deliver sufficient laser energy to the surface of the recording material to create spots in the data writing mode, but should not cause disruption of the surface so as to cause difficulty in the data reading mode. The wavelength of the laser should be compatible with the recording material to achieve this purpose. In the read mode, power is approximately 5% to 10% of the recording or writing power.

Differences in reflectivity between a pit and surrounding material are detected by light detector 65 which may be a photodiode. Light is focused onto detector 65 by beam splitter 67 and focusing lens 69. Servo motors, not shown, control the positions of the mirrors and drive the mirrors in accord with instructions received from control circuits, as well as from feedback devices. The detector 65 produces electrical signals corresponding to pits. Other optics, not shown, could be used to observe the photo images, while data is being read or written on the data strip.

A photodetector array such as CCD could also be used. It could be either a linear array or area array. The number of detector elements per track would be approximately three elements to create a reading redundancy. The surface would be illuminated with low-cost light-emitting diodes generating power primarily in the near infra-red to match the sensitivity spectrum of the photodetector array.

Figure 11:
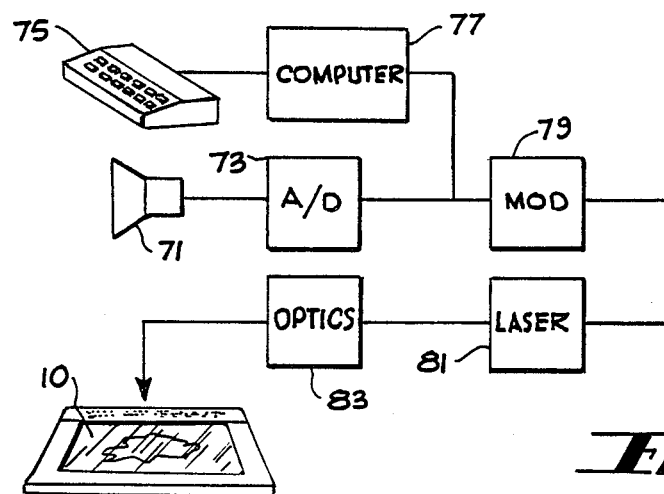
FIG. 11 is a flow plan of the steps for writing spoken words on a medium of the present invention.

The process of recording speech on a slide 10 is illustrated in FIG. 11. Human speech is recorded by speaking into a microphone 71. The sound waves are converted into an electrical signal by the microphone. An analog to digital converter 73, connected to the microphone 71, samples the amplitude of the electrical signal from the microphone and converts it into a digital signal. The sampling rate is of the A/D converter 73 is typically 25,000 to 50,000 bits per second. Alternatively, a digital signal representing artificial speech, such as phoneme speech, may be obtained from a computer 77. Persons can enter the data into the computer 77 through an input device 75 such as a computer keyboard.

The digital signal from either the computer 77 or the A/D converter 73 communicate with a modulator 79 to control a laser 81. Scanning and focusing optics 83, such as the optics described with reference to FIG. 10 direct the laser beam to the strip of laser recording material on slide 10.

I claim:

1. A method of recording an audio-visual slide show comprising,
   collecting a set of slides, each slide having a photographic image dealing with a broad topic, each slide having a conventional mounting included border surrounding the photographic image,
   disposing a laser recording material in the border zone of at least one side of photographic slides which make up the set of slides,
   writing on said laser recording material on said side of slides, with a laser, a data pattern corresponding to spoken words giving a self-contained characterization of the photographic image on an associated slide, said spoken characterization lasting the equivalent of at least 20 seconds of human speech and playable simultaneously with projection of the photographic image, and
   assembling a subset of slides from the set of slides dealing with a topic within the broad topic thereby forming a slide show.

2. The method of claim 1 wherein said spoken words comprise human speech.

3. The method of claim 1 wherein said spoken words comprise artificial speech.

4. The method of claim 3 wherein said spoken words comprise phoneme speech.

5. A photographic slide for use in an audiovisual slide show comprising,
   a photographic image mounted in a conventional slide holder having borders surrounding the image,
   a strip of laser recording material disposed in a border of one side of said holder, said strip having laser written speech thereon, said speech comprising a characterization of the photographic image, said speech lasting the equivalent of at least 20 seconds of human speech and playable simultaneously with projection of the photographic image.

6. The slide of claim 5 wherein said laser written speech is human speech.

7. The slide of claim 5 wherein said laser written speech is artificial speech.

8. The slide of claim 5 wherein said laser written speech is phoneme speech.

9. The slide of claim 5 combined with similar slides with different photographic images, each slide having unique laser written speech thereon comprising a characterization of the corresponding photographic image thereby forming a slide show.

10. The slide of claim 5 with digital information recorded on said strip representing alphanumeric information to be displayed on an accompanying CRT display.

11. The slide of claim 5 with digital information recorded on said strip representing control signals.

12. The slide of claim 5 wherein the photograph was generated by computer graphics.

13. The slide of claim 5 wherein said slide holder has a substantially square configuration having an area of four square inches.

14. The slide of claim 5 wherein said speech lasts the equivalent of at least 50 seconds.

* * * * *